Jan. 29, 1957    M. L. ROBERTSON    2,779,348
FLUID PRODUCTION AND STORAGE CONTROL APPARATUS
Filed Nov. 13, 1952    2 Sheets-Sheet 1

FIG. 1.

INVENTOR.
MELBORNE L. ROBERTSON
BY
ATTORNEY

United States Patent Office 2,779,348
Patented Jan. 29, 1957

2,779,348

FLUID PRODUCTION AND STORAGE CONTROL APPARATUS

Melborne L. Robertson, Laird Hill, Tex., assignor to Gulf Oil Corporation, Pittsburgh, Pa., a corporation of Pennsylvania Application November 13, 1952, Serial No. 320,262

30 Claims. (Cl. 137—119)

The present invention relates to new and useful improvements in apparatus for automatically controlling the supply of a fluid to a multiple-unit storage facility and the sequential filling of selected storage units with supplied fluid.

The paramount aim of the invention is to provide a dependency of the fluid supply control upon the automatic storage unit selector of such a nature that failure of the selector to select a unit in readiness to be filled, either through malfunction of the selector or the actual absence of an available unit in readiness to be filled, will cause the fluid supply control to curtail further fluid supply.

Closely allied to the aim of the preceding paragraph is the desire to provide apparatus in which the fluid-supply control may be made dependent upon the occurrence of one or more other predetermined events to cause curtailing of the supply of fluid, in addition to failure of the selector to locate a storage unit in readiness to be filled.

Another important purpose of the invention is to provide apparatus of the character defined, in which the fluid-supply control may be used to individually and collectively control the supply of fluid from a plurality of fluid sources, and which fluid-supply control may be operated in such a manner that the entire supply of fluid from a plurality of fluid sources may be periodically curtailed according to a predetermined time schedule, and/or the supply of fluid from independent fluid sources be periodically curtailed according to a predetermined time schedule for individual fluid sources.

It is a further aim of this invention to provide apparatus of the character defined, in which the fluid-supply control may be associated with a fluid source that requires pumping, and which will operate to interrupt pumping of such fluid source in addition to otherwise positively curtailing fluid flow through the pumping equipment.

In addition, it is desired to provide a fluid-supply control which may be operated to curtail the supply of fluid from a fluid source that does not require pumping, while operating with respect to a further fluid source that requires pumping in the manner set forth in the preceding paragraph.

An important object of this invention is to provide apparatus of the character defined, wherein the selection of a unit as being in readiness or filling as well as the continued introduction of fluid into a selected unit may be made contingent upon predetermined circumstances in addition to the unit being less than full.

It is also an object of this invention to provide automatic electric control apparatus that is well adapted for the incorporation of indicator lights therewith in such a manner as to require a minimum of additional wiring and yet afford valuable information as to the state of operation of the apparatus.

Still another object of this invention is to provide apparatus of the character defined, which, in addition to having fields of utility in other industries, is particularly well suited for use in producing oil fields; and which in such an environment will serve to automatically and sequentially select and fill such tanks of a tank battery that are in readiness to be filled; which will also serve to shut in individual pumping and flowing oil wells in accordance with predetermined time schedules; and which will shut in all oil wells supplying the tank battery upon failure of the tank selector either to select a tank for filling or upon one of the oil-treating units normally interposed between the wells and the tank battery becoming excessively full.

Inasmuch as it is contemplated that the probable major field of use of the invention will be in controlling oil field production and storage, the invention has been illustrated as applied to such a use in the accompanying drawings, wherein.

Broadly speaking, the invention comprises three cooperating parts, namely, what may be conveniently termed a tank selector and switcher, oil well producing equipment, and apparatus for curtailing production. Each of these parts will be individually described and their cooperation explained hereinafter. It is believed that a more ready understanding will be obtained with a brief introductory recital of the functions of the three parts of the invention.

Accordingly, that portion of the invention termed the tank selector and switcher serves upon completion of the filling of one tank to close the inlet valve thereto, locate another tank in readiness to be filled, and to open the inlet valve thereof. A preferred and an alternative form of this portion of the invention are illustrated and described.

The oil well producing equipment serves to produce and to individually shut in both flowing wells or wells to pump or other artificial lifting devices. Such equipment serves to produce and shut in individual wells according to a predetermined time schedule or each well, but will, in addition, serve to shut in all the oil wells in accordance with a predetermined master time schedule and is also subject to the control of the production curtailing apparatus.

The production curtailing apparatus functions in addition to the time schedule to cause the oil well producing equipment to shut in all the oil wells upon the occurrence of either of two events, namely, upon the failure of the tank selector to select a tank for filling within an adequate period of time, or upon any oil treating vessel interposed between the oil wells and the tank battery becoming excessively full.

Tank selector and switcher

Figure 1:
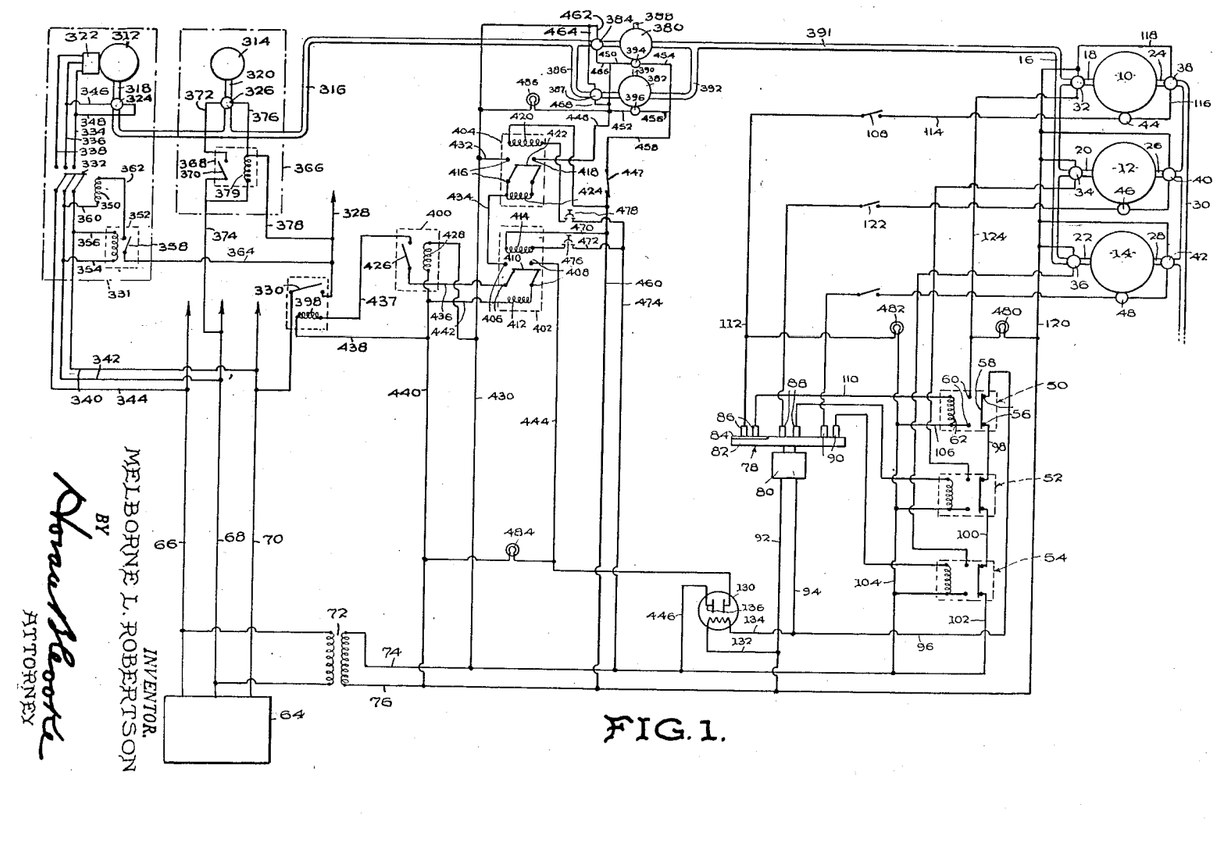
Figure 1 is a schematic illustration of an oil producing and storage facility including oil wells, oil-treating units, a tank battery and associated flow-control equipment, together with a diagrammatic representation of the control apparatus of this invention applied thereto.
Figures 2, 3:
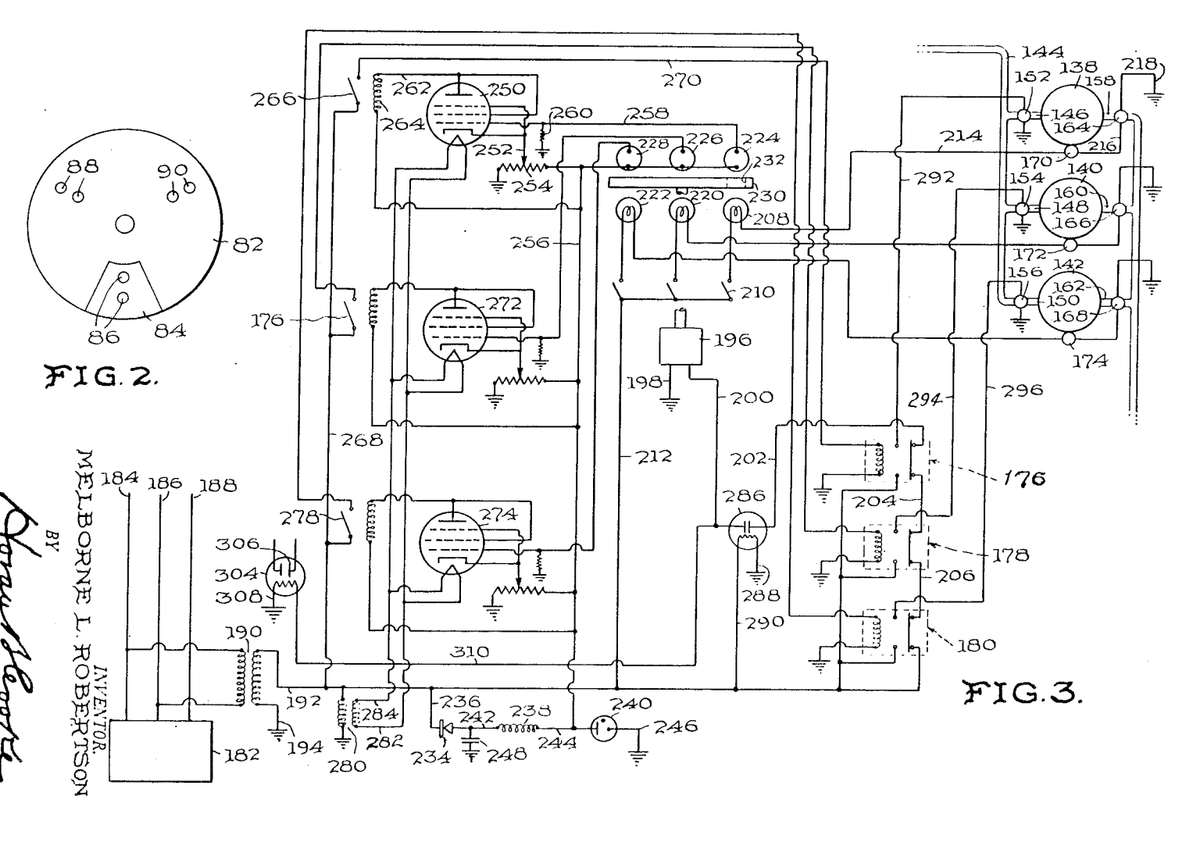
Figure 2 is a top plan view of a rotary switch shown as part of the control apparatus of Figure 1.
Figure 3 is a diagrammatic representation of a modified form of a portion of the apparatus shown in Figure 1.

Attention is first directed to the form of the tank selector and switcher illustrated in Figures 1 and 2, wherein the numerals 10, 12 and 14 designate diagrammatic representations of oil storage tanks of a multiple-tank battery. The tanks 10, 12 and 14 are supplied oil from a header 16 by means of individual tank branches 18, 20 and 22, respectively, and are emptied through individual outlet pipes 24, 26 and 28, respectively, to a discharge line 30.

In order to control the supply of oil to individual tanks, the tank branches 18, 20 and 22 are provided with electrically-actuated inlet valves 32, 34 and 36, respectively.

The electrically-actuated valves 32, 34 and 36 are of conventional two position type and are of such character that upon being energized will open and upon being de-energized will close. Known valves of the type involving the use of an electric motor and hydraulic valve-moving means are preferred for such purpose, although solenoid-actuated valves may also be used.

The outlet pipes 24, 26 and 28 are provided with valve and electric switch assemblies 38, 40 and 42, respectively, which are of a known type in which the electric switch opens and closes with the valve. Thus, when the assembly 38 is operated to permit fluid flow in the outlet pipe 24, the switch component thereof is opened.

The tanks 10, 12 and 14 are also provided with liquid-level sensitive switch assemblies 44, 46 and 48, respectively, of such a character that the switch of any particular switch assembly is closed whenever the liquid in its associated tank is below a predetermined level. The assemblies 44, 46 and 48 are preferably of the conventional float-actuated type, but may be of other known types, such as fluid head pressure-actuated switches, etc.

Solenoid-actuated, double-pole-double-throw relay switches schematically illustrated at 50, 52 and 54 are provided for association with the tanks 10, 12 and 14, respectively. Each of the switches are identical in construction, and it is thought that a detailed description of one will suffice for all. The switch 50 includes a first pair of contacts 56 on the right of switch 50 as shown in Figure 1 that are normally bridged by a blade 58 biased thereagainst, and a second pair of contacts 60 on the left of switch 50 as shown in Figure 1 that are bridged by the movable blade 58 when the solenoid 62 of the switch 50 is energized.

A three-phase power source 64 is provided to which power leads 66, 68 and 70 are coupled. Power for the tank selector and switcher is taken from power leads 66 and 68, with the voltage adjusted to the desired level by means of a transformer 72. The primary of the transformer 72 is connected to the power leads 66 and 68 as shown, and the secondary thereof is coupled to the electric conductors 74 and 76 through which electrical energy is made available to the tank selector and switcher.

A rotary switch assembly is designated generally at 78. Such switch assembly 78 is illustrated diagrammatically and includes an electrically-actuated prime mover 80 drivingly connected to a rotatable disc 82. The disc 82 is fashioned of electrically-insulating material, such as plastic, and is provided with a recess in its upper surface in which a sector 84 formed of electrically-conductive material, such as copper, is suitably secured. The arrangement is such that the disc 82 may be rotated by the prime mover 80 so that the sector 84 may selectively bridge the pairs of stationary contacts 86, 88 and 90 that have sliding contact with the upper surface of the disc 82, as clearly shown in Figure 2.

The dimensions of the sector 84 are such with respect to the angular spacing of the pairs of contacts 86, 88 and 90 that the sector 84 may bridge the contacts of only one pair of contacts at any one time. In addition, the prime mover 80 is of such a type that the disc 82 continues to rotate for only a fraction of the angle subtended by the sector 84 at the center of the disc after the prime mover 80 is de-energized. Preferably, the prime mover 80 is an electric motor provided with reduction gearing, whereby the disc will be driven at a low speed, say in the order of one revolution per minute. Thus, if the prime mover 80 is de-energized shortly after the sector 84 bridges one of the pair of contacts 86, 88 and 90, the disc 82 will stop rotation while such pair of contacts remain bridged.

One power lead 92 of the prime mover 80 is connected to the electric conductor 76, and the other power lead 94 is connected in series with the normally-bridged right pair of contacts of all the switches 50, 52 and 54 to the other electric conductor 74 by means of conductors 96, 98, 100 and 102, as clearly shown in Figure 1. The arrangement is such that as long as the right pair of contacts, such as contacts 56 of switch 50, of all the switches 50, 52 and 54 are bridged; a circuit, which for the purpose of the claims will be called the selector circuit, is closed between the conductors 74 and 96 and through the prime mover 80 thence to the line 76. However, energization of the solenoid of any of the switches 50, 52 and 54, such as solenoid 62 of switch 50, will cause the blade thereof to move from a position bridging the right pair of contacts of such switch and thereby open the selector circuit and de-energize the prime mover 80.

Circuit means are provided for each of the tanks 10, 12 and 14, whereby the solenoid of one of the switches 50, 52 and 54 associated therewith may be energized. Such circuit means are identical for each tank, and it will suffice to define only such circuit means relating to tank 10 and to switch 50 in detail. Such particular circuit means comprises one terminal of the solenoid 62 being connected to the conductor 74 by means of leads 104 and 106, while the other terminal of the solenoid 62 is connected to the other conductor 76 in series through the pair of contacts 86, a manual switch 108, the liquid-level sensitive switch 44 and the valve and switch assembly 38 by means of leads 110, 112, 114, 116, 118 and 120, as shown.

It will therefore be apparent that whenever switch 108 and the switch components of the liquid-level sensitive switch 44 and the valve and switch assembly 38 are closed, bridging of the contacts 86 by the sector 84 will result in energization of solenoid 62. As mentioned previously, energization of the solenoid 62 will cause the blade 58 to move from a position bridging the right pair of contacts 56 to a position bridging the left pair of contacts 60, thereby opening the selector circuit that includes the prime mover 80.

As stated hereinbefore, circuit means such as those described in the preceding paragraph in connection with tank 10 and switch 50 is provided for each of the tanks 12 and 14 and their associated respective switches 52 and 54. The operation of these other circuits is precisely the same as that of the described circuit and their operation may be summarized by stating that bridging of the pairs of contacts 88 and 90 by the sector 84 will result in energization of the solenoids of the switches 52 and 54, respectively, whenever the associated switches in series therewith are all closed, such as manual switch 122, liquid-level sensitive switch 46 and the switch component of the switch and valve assembly 40 which are in series with the pair of contacts 88.

In summary, it may be stated that with respect to the solenoid of each of the switches 50, 52 and 54, a number of conditions are necessary before the same may be energized, namely, the sector 84 must bridge the pair of contacts associated therewith, and the manual switch, the liquid-level-sensitive switch and the switch component of the valve and switch assembly associated therewith must all be closed. Since the sector 84 may only bridge one of the pairs of contacts 86, 88 and 90 at one time, it will be evident that only one of the solenoids of the switches 50, 52 and 54 can be energized at any one time. Furthermore, since the liquid-level sensitive switch associated with each of the tanks is arranged to be closed only when the liquid level in the tank is below a predetermined level, and since the switch element of the associated valve and switch assembly is closed only when the outlet of such tank is closed, it will be evident that the solenoid of the switch associated with such tank may be energized only when the outlet of such tank is closed as well as the tank being filled to a level less than that necessary to close the liquid-level sensitive switch.

An inlet-valve actuating circuit is provided for each of the tanks, and inasmuch as the valve-actuating circuits are identical, only such circuit provided for actuating the inlet valve 32 of tank 10 will be described in detail. The inlet-valve actuating circuit provided for tank 10 includes in series the second pair of contacts 60 of the switch 50 and the electrically-actuated inlet valve 32, such circuit comprising one contact of the pair of contacts 60 being connected to the conductor 74 by means of leads 104 and 106, with the other contact of such pair of contacts 60 being connected to one of the terminals of the electrically-actuated inlet valve 32 by lead 124. The other terminal of the electrically-actuated inlet valve 32 is connected to the conductor 76 by means of lead 120. Thus, whenever the blade 58 of the switch 50 is actuated by the solenoid 62 to bridge the pair of contacts 60, the valve-actuating circuit associated with the electrically-actuated inlet valve 32 is closed, whereby the inlet valve of tank 10 is opened. Similarly, the valve-actuating circuits of tanks 12 and 14 include the electrically-actuated inlet valves 34 and 36, respectively, which electrically-actuated inlet valves 34 and 36 are respectively coupled in series through the second pair of contacts of their associated switches 52 and 54 to the electrical conductors 74 and 76.

Viewed in its broader aspects, the inlet-valve actuating circuits that include the electrically-actuated inlet valves 32, 34 and 36 may be considered controlled circuits, with the circuits that include the pairs of contacts 86, 88 and 90 and the solenoids of the switches 50, 52 and 54 being considered control circuits. In accordance with this view, energization of any of the control circuits serves through the agency of the switches 50, 52 and 54 to open the selector circuit and to control the closure of one of the controlled circuit.

In summary, bridging of the respective left pair of contacts of any one of the switches 50, 52 and 54 will close a circuit through the electrically-actuated inlet valve of the associated tank, so as to open the inlet thereof.

The operation of the tank selector and switcher will be readily understood from the following explanation thereof.

As a starting point, it will be assumed that all of the tanks 10, 12 and 14 are empty and that the outlets thereof are closed and in addition that all of the manual switches corresponding to switch 108 are closed. Furthermore, it will be assumed that the sector 84 is not bridging any one of the pairs of contacts 86, 88 and 90. Under such circumstances, it will be evident that none of the solenoids of switches 50, 52 and 54 are energized and that the blade elements of each of the switches 50, 52 and 54 are bridging the right-hand pair of contacts thereof. The bridging of the right pair of contacts of switches 50, 52 and 54 completes the circuit through the prime mover 80 with the result that the disc 82 is rotated.

Such rotation of the disc 82 will bring the sector 84 into a position that will bridge one of the pairs of contacts 86, 88 and 90, which we will assume to be the pair of contacts 86. Inasmuch as the switch 108 is closed, and by virtue of the fact that the tank 10 is empty and the outlet-valve thereof closed, the switches associated with the liquid-level sensitive switch 44 and the valve and switch assembly 38 are also closed, with the result that bridging of the contacts 86 by the sector 84 completes the circuit through the solenoid 62. Completion of the circuit through the solenoid 62 energizes the same and causes the blade 58 to move from a position bridging the right pair of contacts 56 to a position bridging the left pair of contacts 60 to produce a twofold result. In the first place, movement of the blade 58 from a position bridging the contacts 56 opens the selector circuit through the prime mover 80 which stops rotation of the disc 82 and leaves the sector 84 in a position bridging the contacts 86. In the second place, bridging of the left pair of contacts 60 by the blade 58 completes the valve-actuating circuit associated with tank 10, thereby energizing the electrically-actuated inlet valve 32 of tank 10 to open position.

The electrically-actuated inlet valve 32 will remain energized to permit filling of tank 10 so long as the solenoid 62 is actuated. Eventually tank 10 will become sufficiently filled with liquid that the liquid-level sensitive switch 44 will open with the result of opening the circuit through the solenoid 62, whereupon such de-energization of the solenoid 62 will result in the blade 58 moving from a position bridging the left pair of contacts 60 to a position bridging the right pair of contacts 56 with a twofold result. Such movement of the blade 58 will open the circuit through the electrically-actuated inlet valve 32 and close the selector circuit through the prime mover 80.

As soon as the prime mover 80 is energized, the disc 82 is rotated to a position in which the sector 84 bridges the pair of contacts 88, with the result that the solenoid associated with switch 52 is energized, with such energization of the solenoid opening the selector circuit and closing the circuit through the electrically-actuated inlet valve 34. As in the case of the filling of tank 10, the filling of tank 12 to a predetermined level breaks the circuit, by means of the liquid-level switch 46, through the solenoid of the switch 52 to thereby de-energize the electrically-actuated inlet valve 34 and again close the selector circuit through the prime mover 80.

In an analogous manner, the automatic sequential filling of tank 14 is accomplished.

The above-described operation would be somewhat different had say, for example, tank 12 been initially full, the manual switch 122 open, or the outlet valve thereof open. Had such an initial condition existed, the circuit through the solenoid associated with the switch 52 would not have been completed upon the sector 84 brdging the contacts 88 with the result that the selector circuit through the prime mover 80 would not have been interrupted, nor would the circuit through the electrically-actuated inlet valve 34 have been completed, and accordingly the disc 82 would have continued to rotate until the sector 84 bridged the pair of contacts 90. In such a manner, a tank not in readiness to be filled is by-passed without even momentary disturbance of the continuous operation of the prime mover 80 and without the momentary energization of the electrically-actuated inlet valve associated with the tank to be by-passed.

A tank may be in what may be termed a condition of "readiness to be filled" only when the solenoid of the switch 50, 52 and 54 associated therewith may be energized through action of the selector switch 78. For example, tank 10 is in the condition of "readiness to be filled" when the manual switch 108 is closed, the liquid-level sensitive switch 44 is closed by virtue of the tank being less than full, and the switch component of the valve and switch assembly 38 is closed by virtue of the outlet of tank 10 being closed.

It will also be apparent from the foregoing that, if a tank which is in the process of being filled is inadvertently or otherwise opened to the discharge line 30 by opening its outlet-valve such as 38, 40 or 42, this will immediately open the circuit through leads 116 and 118 for example, which results in breaking the current through coil 62 of relay 50, whereupon the blade 58 moves to the right-hand position bridging contacts 56. This completes the circuit to prime mover 80 through leads 94 and 96 causing the selector to seek another tank in readiness, thus preventing flowing into a tank which is open to the discharge line 30 by the closure of the inlet valve, such as 32, 34 or 36, of the tank concerned. This function is important because the fluid is gauged, i. e., measured, in the tank.

The requisites that may be imposed upon the condition of a tank being in "readiness to be filled" may be multiplied as desired simply by including additional switches, not shown, in series with the associated pair of contacts 86, 88 and 90; with each of such additional switches being associated for actuation with some form of detecting means of the additional requisite desired to be imposed upon the condition of a tank being "in readiness to be filled." For example, for fire protection purposes, it may be desirable to prevent or interrupt the flow of liquid into tank 10 when the same is on fire, in which event a thermal responsive switch, not shown, would be placed in series with the pair of contacts 86 and the solenoid 62, which thermal responsive switch would be responsive to temperature in the vicinity of the tank rising above a predetermined value to open.

The manual switches, such as switch 108, provided in series with each of the pairs of contacts 86, 88 and 90 affords a means whereby the operator may by opening such switch cause the associated tank to be by-passed whenever desired, as when the tank is under repairs or the like.

It will of course be understood that the prime mover 80 rotates the disc 82 in such a manner that the sector 84 will sequentially bridge the pairs of contacts 86, 88 and 90. It is important to note that dependent upon the type of prime mover 80 employed, a predetermined period of time is required for the sector 84 to move from a position bridging any one of the pairs of contacts 86, 88 and 90, until the same has sequentially bridged all the other pairs of contacts, and has again been brought into position bridging the first pair of contacts, assuming continuous operation of the prime mover 80. It will of course be evident that continuous operation of the prime mover 80 for a period sufficient to cause the disc 82 to make a complete revolution can only occur when all of the tanks have been by-passed, or, in other words, whenever none of the tanks is selected as being in readiness to be filled.

Advantage is taken of the fact that continuous operation of the prime mover 80 for a period of time sufficient to cause a complete revolution of the disc 82 can only take place upon the failure of the apparatus to automatically select a tank in readiness to be filled for the purpose of curtailing the supply of liquid to the header 12. The structure utilized for taking advantage of this fact involves the use of an electrical switch which is actuated in erponse to continuous energization of the prime mover 80 for a period of time at least as great as that required for the prime mover 80 to rotate the sector through contact with all the pairs of contacts 86, 88 and 90, which period of time may be conveniently referred to as the "selector time cycle." Various types of conventional electrically-actuated switches incorporating a time-delay feature may be utilized for this purpose. However, the use of a time-delay relay or a so-called Amperite time-delay tube such as that indicated at 130 is preferred.

The time-delay tube 130 has the coil thereof connected in parallel to prime mover 80 by means of leads 132 and 134 that are connected respectively to the leads 92 and 94. The switch element 136 of the time-delay tube 130 is normally open, but is arranged to close in response to continuous energization of the tube 130 through the leads 132 and 134 for a time interval equal to or slightly in excess of the hereinbefore defined "selector time cycle." Inspection of the drawing will indicate that the parallel arrangement of the time-delay tube 130 and the prime mover 80 causes the tube 130 and the prime mover 80 to be concurrently energized and deenergized. It will thus be seen that whenever the sector 84 has been continuously moved through sequential contact with all the pairs of contacts 86, 88 and 90 without the prime mover being de-energized, it may be stated that the tank selector and switcher has "failed to locate a tank" in the entire tank battery that is in "readiness to be filled." Such continuous movement of the sector 84 requires continuous energization of the prime mover 80 and the coil of the time-delay tube 130 for the selector time cycle and will result in closure of the switch 136. Subsequently, reference will be made to the effect of closure of the switch 136 in connection with the description of the production-curtailing apparatus.

The field of use of the hereinbefore-described tank selector and switcher is greater than that of merely controlling the storage of oil or other liquids, and may be readily extended to the storage of gases in a plurality of tanks. In the latter use, the extent to which tanks are desired to be filled may be ascertained by pressure, and in such use, a pressure-sensitive switch would be employed in connection with each tank in lieu of a liquid-level sensitive switch, with such switch being arranged to open when the pressure within the tank exceeds a predetermined level. Those familiar with the art of fluid storage will readily comprehend the adaptation of the described tank selector atnd switcher to the storage of gases.

Before proceeding with a description of the production controlling equipment and the production curtailing apparatus, it is though advisable to describe the alternative form of tank selector and switcher shown in Figure 3, which may be used in lieu of the hereinbefore described preferred form of tank selector and switcher. The Figure 3 apparatus will be described for oil storage purposes but may also be employed for other purposes as may that of Figure 1.

The alternative form of tank selector and switcher shown in Figure 3 is shown in conjunction with storage tanks 138, 140 and 142 which correspond to tanks 10, 12 and 14 shown in Figure 1. The tanks 138, 140 and 142 are supplied fluid from a header 144 through individual tank branches 146, 148 and 150, respectively. The tank branches 146, 148 and 150 are provided with electrically-actuated inlet valves 152, 154 and 156, respectively, such electrically-actuated valves corresponding to the electrically-actuated inlet valves 32, 34 and 36 shown in Figure 1.

In addition, the tanks 138, 140 and 142 are provided with outlets 158, 160 and 162, respectively. The outlets 158, 160 and 162 are provided with valve and switch assemblies 164, 166 and 168, respectively, that correspond to the assemblies 38, 40 and 42 of Figure 1. Furthermore, the tanks 138, 140 and 142 are provided with liquid-level sensitive switches 170, 172 and 174 that correspond to the liquid-level sensitive switches 44, 46 and 48 of Figure 1.

Solenoid-actuated double-pole-double-throw switches 176, 178 and 180, corresponding to the switches 50, 52 and 54 of Figure 1, are associated respectively with the tanks 138, 140 and 142.

A three-phase source of electrical energy 182 is provided having power leads 184, 186 and 188, with the power leads 184 and 186 being connected to the primary winding of a transformer 190 that corresponds to the transformer 72 of Figure 1. The secondary winding of the transformer 190 is connected to an electrical conductor 192 that corresponds to the electrical conductor 74 of Figure 1, while the other terminal of the transformer 190 is grounded, as at 194, with the ground potential in this modification of the invention corresponding to the conductor 76 shown in Figure 1.

This form of the invention also involves the use of a prime mover 196 that corresponds to the prime mover 80 of Figure 1. The prime mover 196 has one terminal grounded as at 198 and is connected in series through all the first or right-hand pairs of contacts of all of the switches 176, 178 and 180 to the electrical conductor 192 by means of leads 200, 202, 204 and 206, it being understood that the right pairs of contacts of the switches 176, 178 and 180 are normally bridged by the blade elements of such switch when the solenoids thereof are de-energized. The arrangement is such that energization of the solenoid of any of the switches 176, 178 and 180 will open the circuit through the prime mover 196 and that subject to an exception subsequently to be noted, whenever all of the solenoids are de-energized the circuit through the prime mover 196 which may be referred to as the selector circuit is closed.

The principal distinction between the alternative form of tank selector and switcher of Figure 3 and that shown in Figure 1 resides in the manner in which the solenoids of the switches 176, 178 and 180 are energized. Whereas the form of tank selector and switcher shown in Figure 1 employs the rotary switch 78 in order to complete the circuits through the solenoids, the alternative form of tank selector and switcher shown in Figure 3 employs a system of photoelectric circuits and relay switches to accomplish the same purpose. The alternative tank selector and switcher of Figure 3 involves the use of an electric lamp circuit in association with each of the tanks and the arrangement is such that the lamp circuit associated with each tank is closed so as to light an electric lamp in such circuit whenever the tank associated therewith is in "readiness to be filled." A photoelectric circuit means is associated with each of the electric lamps in such a manner as to be actuated in response to the associated electric lamp being lighted to actuate an electric relay switch system for energizing the solenoid of the associated double-pole-double-throw switch of such tank. In addition, means operated by the prime mover 196 is provided that will permit only one of the electric lamps to actuated its associated photoelectric circuit means at any one time.

The electric lamp circuits associated with each of the tanks 138, 140 and 142 are identical, and it is thought that a description of one of such circuits will suffice for all. The electric lamp circuit associated with the tank 138 comprises an electric lamp 208 having one terminal connected through a manual switch 210 to the conductor 192 by a lead 212, and having its other terminal grounded through the liquid-level sensitive switch 170 and the valve and switch assembly 164 in series by means of leads 214, 216 and 218. It will thus be seen that when the manual switch 210 is closed, as well as the switch elements of the liquid-level sensitive switch 170 and the valve and switch assembly 164, the electric lamp 208 is lighted. In a similar manner, electric lamps 220 and 222 are associated with the tanks 140 and 142, respectively.

As thus far explained, it will be understood that of the electric lamps 208, 220 and 222, such lamps will be lighted when the tank associated therewith is in readiness to be filled, provided the manual switches associated therewith are in their normal closed position.

A photoelectric circuit is associated with each of the electric lamps 208, 220 and 222 with such photoelectric circuits including photoelectric sensitive elements 224, 226 and 228 so arranged with respect to the associated electric lamps as to be illuminated thereby but for the interpositioning of an opaque disc 230 between the photoelectric sensitive elements and the electric lamps.

The opaque disc 230 is rotatable and is operatively connected by means not shown to the prime mover 196 so as to be driven by the latter. The opaque disc 230 is provided with an opening 232 therethrough, the arrangement being such that during rotation of the disc 230, the opening 232 is sequentially brought into registry with each of the electric lamps 208, 220 and 228 and the individual photoelectric sensitive elements associated with such electric lamps, so that only one of the photoelectric sensitive electric elements may be illuminated by its associated electric lamp at any one time.

It is thought that the analogy between the opening 232 of the disc 230 and the sector 84 shown in Figure 1 will be readily appreciated; however, it should be pointed out that whenever the prime mover 196 is de-energized with the opening 232 being in registry with a particular electric lamp and the photoelectric sensitive element associated with such lamp, the rotation of the disc 230 will stop with sufficient abruptness that the opening 232 will remain in such registry.

Means is provided in association with each of the photoelectric sensitive elements that will effect energization of the switches 176, 178 and 180 upon such photoelectric sensitive element being illuminated. Such means provided for each of the photoelectric sensitive elements are identical and it is thought that it will suffice to describe in detail only such means as is associated with the photoelectric sensitive means 224. Such photoelectric means in association with the photoelectric sensitive element 224 comprises a common source of D.-C. voltage consisting of a rectifier 234 connected to the conductor 192 by means of a lead 236 and connected in series to ground through an inductance 238 and voltage regulator tube 240 by means of leads 242, 244 and 246. The lead 242 is grounded through a condenser 248, with the arrangement being such that the lead 244 has a positive potential that is substantially constant with respect to ground. In this manner plate voltage is supplied to lead 256.

A pentode 250 is provided, the cathode of which is connected to the slider 252 of a variable cathode-bias resistor 254 which is applied between a conductor 256 and the ground, with the conductor 256 being connected to the lead 244. The photoelectric sensitive element 224 has one terminal connected to the conductor 256 and its other terminal connected by means of a lead 258 to the control grid of the pentode 250, such lead 258 being provided with a grid-leak resistor 260 to ground. The anode of the pentode 250 is connected by lead 262 to the coil 264 of a sensitive relay whose contact switch 266 is normally open but which upon energization of coil 264 closes the switch 266. The other side of coil 264 is connected to plate-supply lead 256.

The normally-open relay switch 266 is connected in series with the coil of relay 176 in a circuit that starts at lead 192, through lead 268, switch 266, lead 270, the coil of relay 176 and thence to ground.

The operation is such that whenever the lamp 208 is not energized or the opening 232 not in registry therewith, the grid of the pentode 250 is negative so as to prevent the flow of sufficient plate current in the lead 262 to cause the relay coil 264 to actuate closure of the relay switch 266, so that the circuit through the solenoid of the switch 176 remains open; however, upon the simultaneous occurrence of the electric lamp 208 being energized and the registry of the opening 232 therewith, the photoelectric sensitive means 224 is energized to render the grid of the pentode 250 more positive, whereupon sufficient plate current flows through the solenoid 264 to actuate closure of the switch 266, thereby completing the circuit through the solenoid of the switch 176.

Similar circuits are provided for use in conjunction with each of the photoelectric sensitive elements 226 and 228 which include pentodes 272 and 274, respectively, which will serve upon their respective photoelectric sensitive elements being illuminated to close the switches 276 and 278, respectively. It will be evident upon inspection of Figure 3 that the switches 276 and 278 bear the same relation to the solenoids of switches 178 and 180 that the switch 266 has previously been described as bearing to the solenoid of the switch 176.

In order to energize the heaters of the pentodes 250, 272 and 274, a suitable transformer 280 is provided, the primary of which is connected between the conductor 192 and ground, with the secondary terminals 282 and 284 of such transformer being connected in parallel to the heaters of the tubes 250, 272 and 274 as shown in Figure 3.

It will be evident that when the heaters of the pentodes have become cool, as would occur during a power failure or the like, a certain minimum time period is necessary for the heaters to become sufficiently heated for operation of the pentodes after the resumption of the application of electrical power thereto. Since during the time required for the pentodes to become sufficiently warm for operation none of the solenoids of the switches 176, 178 and 180 may be energized to open the selector circuit that includes the prime mover 196, means must be provided to otherwise open the selector circuit during this pentode heating period if it is desired that the prime mover 196 not operate during such pentode heating period.

Various reasons exist for the desirability of preventing operation of the prime mover 196 during the time interval that the pentodes are being heated to an operative temperature, among which may be mentioned that it is undesirable to have a power failure cause the tank selector and switcher to switch upon resumption of power from a tank that was in the process of being filled at the commencement of the power failure. In other words, even though the filling of a tank will be interrupted upon the occurrence of a power failure, it is desired that upon the resumption of power that the apparatus continue to fill the same tank rather than initiate a new search for a tank in readiness to be filled upon the resumption of power. This objective is realized by the provision of a time-delay tube 286, the coil of which is grounded as at 288 and connected to the conductor 192 by lead 290. The switch element of the time-delay tube 286 is disposed in the lead 202 of the selector circuit. The time-delay tube 286 is of the type in which the switch element thereof is normally open, but which switch element is closed and remains closed after the coil thereof has been energized for a predetermined period of time. In the case of the time-delay tube 286, the time delay provided for the closure of the switch element thereof after the energization of the coil thereof is somewhat in excess of the time required for the pentodes to have been heated to an operative temperature, a period approximately 15 seconds usually being adequate for this purpose. Thus, it will be evident that the selector circuit that includes the prime mover 196 can only be closed during such time that the pentodes are heated to an operative temperature.

The electrically-actuated inlet valves 152, 154 and 156 are each grounded and connected respectively by leads 292, 294 and 296 through a second pair of contacts of the switches 176, 178 and 180 to the conductor 192.

Viewed in its broader aspects, the inlet-valve actuating circuits of the apparatus shown in Figure 3 may, as in the case of the apparatus shown in Figure 1, be considered controlled circuits, with the circuits that include the solenoids of switches 176, 178 and 180 being considered control circuits.

The operation of the tank selector and switcher shown in Figure 3 will be readily understood, particularly in the light of the hereinbefore described operation of the tank selector and switcher shown in Figure 1.

In its tank selecting function, the prime mover 196 is continuously energized until the same has brought the opening 232 of the disc 230 into registry with one of the electric lamps 208, 220 and 222 that is energized, it being recalled that only such of said electric lamps are energized as are in association with a tank in readiness to be filled. Upon opening 232 being brought into registry with an energized electric lamp, the associated photoelectric sensitive element is actuated so as to cause its associated pentode to become conductive to such an extent that a solenoid in the plate circuit thereof closes one of the switches 266, 276, 278 that causes energization of the solenoid of one of the switches 176, 178 and 180. Energization of the solenoid of any one of the switches 176, 178 and 180 causes the blade element of such switch to move so as to open the selector circuit and at the same time to bridge the left-hand pair of contacts of such switch that is in series with one of the electrically-actuated inlet valves. It will thus be seen that bridging the left-hand pair of contacts of any one of the relays 176, 178 and 180 will energize the electrically-actuated inlet valve associated therewith.

As soon as the tank has been filled to a sufficient extent to cause opening of the liquid-level sensitive switch (170, 172 or 174) associated therewith, the electric lamp (208, 220 or 222) in circuit therewith will become de-energized, and through the action of the photoelectric sensitive element (224, 226 or 228) associated with such electric lamp the related pentode (250, 272 or 274) becomes sufficiently non-conductive that the solenoid of whichever of the switches 176, 178 and 180 is associated with the tank being filled becomes de-energized, thereupon opening the left pair of contacts, and at the same time closing the selector circuit.

It is further evident that should a tank which is in the process of being filled be opened to the discharge line, the opening of its outlet valve such as 164, 166 or 168 and the switch associated therewith will immediately open the circuit through the associated lamp (208, 220 or 222) and in a manner similar to that just described cause de-energization of the respective relay 176, 178 or 180, thereupon opening its left-hand contacts and closure of its right-hand contacts to effect closure of the respective tank-inlet valve 152, 154 or 156.

The tank selector and switcher shown in Figure 3 incorporates a time-delay tube 304 which is similar to and corresponds in purpose to the time-delay tube 130 provided in conjunction with the apparatus shown in Figure 1. As in the case of the time-delay tube 130, the switch element 306 of the time-delay tube 304 is normally open but will close in response to continuous energization of the coil thereof for a predetermined time, namely, a period of time equal to or slightly in excess of the selector time cycle. The coil of the time-delay tube 304 is in electrical parallel with the prime mover 196 so as to be energized concurrently therewith, one terminal of the coil of the time-delay tube 304 being grounded as at 308 with the other terminal of the coil being connected to the prime mover lead 200 by means of lead 310.

It will thus be seen that the time-delay tubes 130 and 304 of both forms of the invention will operate in the same manner with respect to failure of the tank selector and switcher to locate a tank in readiness to be filled from the entire number of tanks associated with such element of apparatus.

Although only three tanks have been shown in conjunction with each form of the tank selector and switcher, the manner in which the principles of the invention may be extended in either form of the invention to control the storage of fluid in a lesser or greater number of tanks should be obvious. Three tanks are shown arbitrarily to indicate broadly the manner in which the invention may be associated with a plurality of tanks.

Oil production control equipment

Referring again to Figure 1, there is indicated at 312 a schematic representation of an oil well of the type that requires pumping, and indicated at 314 is an oil well capable of flowing under its own pressure. Although only one of each type of oil well is illustrated in the drawing, it will subsequently become apparent that the present invention may be readily adapted for the control of any number of either type of oil well indicated.

A common conduit 316 is provided for gathering the oil produced by the oil wells and is provided with oil well branches 318 and 320 coupled individually to the oil wells 312 and 314. The oil well 312 is provided with electrically-actuated means indicated at 322 for operating a conventional pump associated with the well 312, and the oil well branches 318 and 320 of the conduit 316 are provided with electrically actuated oil well control valves 324 and 326, respectively. The electrically-actuated oil well control valves 324 and 326 are of the type in which the valves normally closed when electrically de-energized but which upon electrical energization will open, and are of the same general type as the previously described electrically-actuated inlet-valves for the storage tanks. Obviously, the electrically-actuated oil well control valves 324 and 326 will be of such design as to be capable of positively shutting down production of the oil well associated therewith upon deenergization, and may be of any conventional type, such as the well known electro-hydraulic type or the solenoid-actuated type.

Energy for the actuation of the valves 324 and 326, as well as the pump-actuating means 322, may be derived from the same power source as that which actuates the tank selector and switcher, namely, the power leads 66, 68 and 70. The electrical energy distribution system also includes a control wire 328 that is normally electrically connected to the power lead 70 through a normally-closed solenoid actuated switch 330 whose operation will be described in detail subsequently.

The manner in which pumping wells, such as oil well 312, are connected to the power source and are individually controlled is indicated within the dashed outline 331. The pump actuating means 322 is electrically connected to the power leads 66, 68 and 70 through a triple-pole-single-throw switch 332 by means of conductors 334, 336 and 338 connected intermediate such means and the switch 332 and conductors 340, 342 and 344 connected between the switch 332 and the power leads 66, 68 and 70. The electrically-actuated oil well control valve 324 is connected between the conductors 334 and 336 by means of leads 346 and 348, respectively, the arrangement being such that the means 322 and the valve 324 are concurrently energized when the switch 332 is closed. Therefore, the valve 324 will be open whenever the pump-actuating means 322 is energized, and will be closed whenever the pump actuating means 322 is de-energized.

The switch 332 is solenoid actuated, the arrangement being such that whenever the solenoid 350 is energized, the switch 332 will be closed, with the switch 332 being bias to the open position whenever the solenoid 350 is de-energized. Clock controlled switch means is indicated at 352, the electric clock mechanism of which is energized by conductors 354 and 356 connected to the conductors 342 and 340, respectively. The clock controlled switch means 352 includes a switch 358 that will open and close according to a predetermined time schedule, and the switch 358 is arranged in electrical series with the solenoid 350 between the conductor 342 and the control lead 328 by means of conductors 360, 362 and 364. As will be apparent from the drawing, the solenoid 350 will be actuated whenever the switch 358 and the switch 330 are closed, so that when such switches are closed, the solenoid 350 will actuate the switch 332 into closed position and accordingly effect production of the oil well 312; however, whenever either the switch 358 is opened by the clock means 352, or the switch 330 is opened in a manner to be subsequently described, the solenoid 350 is de-energized whereupon the switch 332 opens thus shutting off or curtailing production of oil well 312.

As stated previously, any number of pumping wells may be controlled according to the principles of the present invention, with each of the pumping wells being connected to the power leads 66, 68 and 70, as well as the control lead 328 in the manner indicated for the single pumping well 312 illustrated. It will be evident that each of such wells may have the production thereof individually curtailed through the operation of the individually provided clock-controlled switch means 352 thereof, and that the production of all such pumping wells may be simultaneously curtailed by the opening of the switch 330, since it will be evident that the switch 330 is in series with the solenoids of each well that corresponds to the solenoid 350 illustrated.

Enclosed by dashed lines 366 is the arrangement by which the production of flowing wells is controlled. Such construction includes a clock-controlled switch means 368 similar to the previously described clock controlled switch means 352. The clock controlled switch means 368 includes a switch 370 controlled thereby to open and close according to a predetermined time schedule. The electrically-actuated oil well control valve 326 is arranged in electrical series with the switch 370 to the power lead 68 and the control power lead 328 by means of conductors 372, 374, 376 and 378, the arrangement being such that whenever the switches 370 and 330 are closed, the valve 326 is open; however, whenever the clock controlled switch 370 is open, or the switch 330 is open, the electrically-actuated oil well control valve 326 is de-energized to shut in the flowing well 314.

The electric clock mechanism 379 of the switch-actuating clock means 368 is connected between the conductors 374 and 378 in such a manner as to be energized whenever the switch 330 is closed.

It can thus be seen that with the arrangement illustrated, the clock-controlled switch means 352 operates continuously and independently of the switch 330, while the clock-controlled switch means 368 is energized solely during the periods that the switch 330 is closed. Optionally, however, the clock mechanism 379 may be electrically connected between the conductor 374 and the power lead 70, rather than between the conductors 374 and 378, so as to be continuously energized. It will thus be apparent that clock-controlled switch means 368 may be so constructed and arranged as to be either dependent, as shown, or independent upon the operation of switch 330. By the same token, the operation of the clock-controlled switch means 352 may be made dependent upon the closure of the switch 330 by simply connecting the lead 356 to the control lead 328, rather than the power lead 340.

As in the case of the means for controlling the production of pumping wells, any number of flowing wells may be connected to the power lead 68 and the control power lead 328. Each individual flowing well, such as 314, may be shut down according to a predetermined time schedule by means of a clock-controlled switch, such as that shown at 368, and all of the flowing wells will be shut down upon the opening of the switch 330.

The operation of the oil production control equipment may be briefly summarized by stating that the production of each oil well, either flowing or pumping, may be individually controlled by the clock controlled switch means associated with each well, and in addition the production of all oil wells, both pumping and flowing will be shut down whenever the switch 330 is open. It will be appreciated that the provision of an oil well control valve in each of the oil well branches will prevent oil from a well having a high head pressure from flowing into a well of lesser head pressure. In addition, it will be appreciated that the provision of an oil well control valve in each of the oil well branches permits the individual oil well to be operated upon time schedules independent of the time schedules set up for the other oil wells.

*Oil production curtailing apparatus*

In the usual oil field producing installation, the oil produced from the individual wells is passed through one or more oil-treating vessels prior to storage thereof, and in Figure 1 such oil treating vessels are indicated as taking the form of a heater treater 380, and a separator 382. The oil gathering conduit 316 is arranged to discharge into the heater treater 380 through an electrically-actuated control valve 384, such valve 384 being normally open when the same is de-energized, and which will close upon energization, and the same may be either of the electric motor actuated type or the solenoid actuated type for the purpose desired.

The separator 382 receives oil from the conduit 316 through a branch conduit 386 connected thereto. The branch conduit 386 is connected to the conduit 316 upstream of the electrically-actuated control valve 384 and is provided with an electrically-actuated control valve 387 that corresponds in type and function to the valve 384.

The heater treater 380 and the separator 382 are provided with gas vents 388 and 390 from which separated gas may be passed to a gasoline absorption plant or other apparatus, not shown, for subsequent treatment.

The heater treater 380 is provided with a liquid discharge line 391 that is connected to the header 16 for storage in the tanks 10, 12 and 14. The separator 382 is provided with a liquid discharge line 392 that is connected to the line 391.

The nature of the crude oil produced determines whether the same should be passed through the heater treater 380 or the separator 382, and accordingly, suitable valve means, not shown, may be provided in the lines 316, 386, 391 and 392 to selectively direct all the oil moving from the line 316 to the line 391 through either the heater treater 380 or the separator 382.

The heater treater 380 and the separator 382 are provided with liquid-level sensitive switches 394 and 396, respectively. The arrangement is such that the switches 394 and 396 are normally open, but will close when the liquid level in the vessel associated therewith rises above a predetermined height. For example, the switch 396 is so constructed and arranged to close prior to the liquid level in the separator 382 rising to such a height as to permit liquid to pass into the gas discharge line 390.

The fundamental purpose of the oil production curtailing apparatus is to cause the switch 330 to open and thereby close down the production of all the oil wells whenever the tank selector and switcher fails to select a tank for filling, or whenever either of the vessels 380 or 382 becomes excessively filled. In addition, it is the purpose of the oil production curtailing apparatus to afford a means for opening and closing the switch 330 according to a predetermined time schedule. These purposes are realized by the provision of a circuit having a solenoid 398 therein, which solenoid 398 is so constructed and arranged with respect to the switch 330 as to close the latter when energized from its normally biased open position.

The solenoid 398 is arranged in electrical series with three separate sets of electrical switch means between the electrical conductors 74 and 76, so that the opening of any of such three sets of switch means will cause de-energization of the solenoid 398 and the consequent opening of the switch 330. Each of the three sets of switch means is normally closed and is responsive to open upon the occurrence of one of the above-mentioned conditions under which it is desired to curtail the production of all of the oil wells.

The aforementioned three sets of switch means in association with the solenoid 398 and means for actuating such switch means comprise a master clock controlled switch means 400 and solenoid actuated switches 402 and 404.

The switch means 402 includes two pairs of contacts, namely, contacts 406 and contacts 408. Switch means 402 also includes a movable blade structure 410 for simultaneously bridging both pairs of contacts 406 and 408, and a solenoid 412 is provided, which upon energization will actuate the blade structure 410 to simultaneously open both of the pairs of contacts 406 and 408. The blade structure 410 may be moved to its normal position closing both pairs of contacts 406 and 408 by means of a solenoid 414 effective for this purpose when energized.

The switch means 404 is similar to the described switch means 402 and includes pairs of contacts 416 and 418, a solenoid 420 for actuating upon energization a blade structure 422 into its normal position closing the contacts 416 and 418, and a further solenoid 424 responsive upon energization thereof to move the blade structure 422 so as to open the pairs of contacts 416 and 418.

The clock-controlled switch means 400 includes a switch 426 that is opened and closed according to a predetermined time schedule and is actuated by an electric clock mechanism diagrammatically illustrated at 428. The circuit which includes the solenoid 398 comprises a lead 430 connected to the conductor 74, and leads 432, 434 and 436 connecting the pairs of contacts 416 and 406 in series between the lead 430 and the switch 426. In turn, the switch 426 and the solenoid 398 are connected in series to conductor 76 by leads 437, 438 and 440. It will thus be seen that the solenoid 398 is energized from the conductors 74 and 76 only when the switch 426 and the pairs of contacts 406 and 416 are closed.

The switch 426 is actuated for opening and closing according to a master time schedule for all the oil wells by means of the diagrammatically illustrated electric clock mechanism 428 that is connected electrically between the leads 430 and 440 for continuous energization.

Means is provided for opening the contacts 406 by energizing the solenoid 412 whenever the switch element 136 of the time delay tube 130 is closed. Such means for energizing the solenoid 412 includes in series the switch element 136 and the pair of contacts 408, such electrical components being connected between the conductors 74 and 76 by means of the aforementioned lead 440, and leads 442, 444 and 446. It will thus be seen that the blade structure 410 is actuated to open both pairs of contacts 406 and 408 by energization of the solenoid 412 whenever the switch element 136 is closed, thus making the energization of the solenoid 398 dependent upon the switch element 136 being open.

Means is provided to energize the solenoid 424 and thus open the pair of contacts 416 in response to closure of either of the liquid-level sensitive switches 394 and 396. The electric circuit provided for this purpose comprises the liquid-level sensitive switches 394 and 396 being connected in electrical parallel between one of the contacts 418 and a terminal of the normally closed manual switch 447 by means of a lead 448 having branches 450 and 452 connected to the liquid-level sensitive switches 394 and 396. The liquid-level sensitive switches 394 and 396 are respectively connected by branches 454 and 456 to a conductor 458 having connection with the switch 447. The other terminal of the switch 447 is connected by a conductor 460 to the power source conductor 76. The solenoid 424 is connected between one of the pairs of contacts 418 and the lead 434, and it will thus be seen that whenever the switch 447 is in its normally closed position, closure of either of the liquid-level sensitive switches 394 and 396 will complete a circuit through the solenoid 424 to open the contacts 416, which opening of the contacts 416 will result in de-energization of the solenoid 398.

It will be recalled that the electrically-actuated control valves 384 and 387 are of such nature that when de-energized such valves are opened and which close upon energization. The electrical arrangement of such electrically-actuated control valves 384 and 387 with respect to the previously described liquid-level sensitive switches 394 and 396 is such that energization of both of such control valves occurs whenever either one of the liquid-level sensitive switches 394 and 396 is closed with the switch 447 being also closed. Such electrical arrangement comprises the electrically-actuated control valves 384 and 387 being connected in electrical parallel between the conductor 74 and the lead 448, by means of the lead 430 that is connected through branches 462 and 464 to the valves 384 and 387, respectively, the valve 384 being connected to the lead 448 by a lead 466, and the valve 387 having connection to the lead 448 by means of a branch lead 468.

The electrically-actuated control valves 384 and 387 are arranged in circuit in such manner that with the manually-operated switch 447 in its normally closed position, closure of either of the liquid-level sensitive switches 394 and 396 will complete a circuit through the valves 384 and 387 to energize both of them whereupon they will move to the closed position.

In view of the foregoing, it will be seen that closure of either of the liquid-level sensitive switches 394 or 396 will not only cause de-energization of the solenoid 398, but will also cause energization of both of the control valves 384 and 387.

It will be appreciated that after either of the solenoids 412 or 424 have been energized to cause an opening of their respective switches, such switches will remain open until either manually closed, or preferably by means of the energization of the solenoids 414 and 420 that are provided for this specific purpose. The solenoid 414 is connected by means of leads 470 and 472 to leads 460 and 474, respectively, with the lead 472 including a normally-open switch or reset button 476. The leads 460 and 474 are connected to the conductors 76 and 74, respectively, whereby closure of the switch 476 will cause energization of the solenoid 414, and consequently the closing of the contacts 406 and 408. The solenoid 420 is connected between the leads 460 and 474 in a manner similar to that of the solenoid 414, and is provided with a normally-open switch or reset button 478, whereby the circuit through the solenoid 420 between the conductors 74 and 76 may be completed for causing the blade structure 422 to move into a position closing the contacts 416 and 418.

It will thus be apparent that upon either of the solenoids 412 and 424 having once been energized, the solenoid 398 will remain continuously de-energized, and in order to resume operation of the apparatus it is necessary for the operator to physically depress the appropriate reset button, either 476 or 478. This is an important operational advantage in that the operator is apprised of the fact that some condition has arisen causing an unscheduled curtailment of production, such as the separator becoming over full, and he is given an opportunity to remedy the cause of the difficulty prior to attempting to resume production.

Of course, it would be a simple matter to so modify the illustrated construction so that the above-mentioned physical resetting operation would not be necessary, but such modification would permit a bad condition such as the discharge line 392 of the separator becoming clogged to become more aggravated without the operator becoming aware of the fact. Although not shown, such modification could simply take the form of mechanically biasing the blade structures 410 and 422 towards the switch closing positions. In addition, the solenoid 412 would be connected directly to the lead 444 rather than through the pair of contacts 408, while the solenoid 424 would be connected directly between the leads 430 and 448, whereby the solenoids 412 and 424 would be energized solely during the time the switch element 136 and one of the switches 394 and 396 are closed, respectively. Whenever it is desired to prevent energization of the solenoid 424 and the valves 384 and 387 irrespective of the closure of either of the switches 394 and 396, this may be accomplished by opening the switch 447. For example, the switch 447 may be opened when it is desired to manually dump the separator 382 upon the latter becoming overfull.

*Operation*

The operation of the tank selector and switcher, as well as the operation of the oil production control equipment and the oil production curtailing apparatus have already been individually described above. The combined operation of these three units will now be described.

Referring to the structure shown in Figure 1 for an explanation of the over-all operation of the invention, the tank selector and switcher will operate upon the completion of filling of any of the tanks to select or locate a further tank in readiness to be filled and upon locating such a further tank, the inlet valve of such tank is opened to permit the filling thereof. In the event that the tank selector and switcher fails to select or locate a tank in readiness to be filled within a time interval equalling or slightly in excess of the selector time cycle, the switch element 136 of the time-delay tube 130 is closed. Such closure of the switch element 136 results in the energization of the solenoid 412 and the consequent de-energization of the solenoid 398 to effect thereby the opening of the control switch 330. Opening of such switch 330 results in shutting down all the oil wells producing oil for storage in the tank battery.

In addition to the switch 330 opening as a consequence of the failure of the tank selector and switcher locating a tank in readiness to be filled, the switch 330 is opened in accordance with a predetermined time schedule set by the clock controlled switch means 400. Furthermore, overfilling of either of the oil treating vessels 380 and 382 will result in opening the switch 330 in a manner similar to failure of the tank selector and switcher.

It is to be noted that de-energization of the solenoid 398 and the consequent opening of the switch 330 whenever occurring as a result of the failure of the tank selector or switcher to locate a tank in readiness to be filled, or the overfilling of either of the oil treating vessels 380 and 382 will necessitate resetting of the switch means 402 or 404, respectively, by the use of the reset buttons 476 and 478, respectively; however, such resetting operation is not necessary when the de-energization of the solenoid 398 occurs as the result of the opening of the switch 426.

The individual oil wells, whether of the flowing or pumping type, will operate in accordance with individual predetermined production schedules, while being subject to the over-all control maintained by the opening and closing of the switch 330 in accordance with the de-energization and energization of the solenoid 398.

The alternative form of tank selector and switcher shown in Figure 3 may be readily substituted for that shown in Figure 1, it being thought evident that the manner of such substitution will be evident to those skilled in the art. However, in order to avoid any difficulty on the part of those seeking to realize the advantages of the invention for using the modified form of tank selector and switcher, the manner of such substitution will be set forth in some detail.

The condenser 74 shown in Figure 1 would be connected to the components of the modified form of tank selector and switcher shown in Figure 3 in the same manner as conductor 192 is shown connected to such components. The conductor 76 would be grounded in the manner as shown at 194 in Figure 3, and the components of the modified tank selectors and switcher would be grounded in the same manner as shown in Figure 3, or alternatively, the components shown grounded in Figure 3 could be connected directly to the conductor 76. The lead 444 shown in Figure 1 would be connected to one terminal of the switch element 306 of the time-delay tube 304 and the other terminal of the switch element 306 would be connected to the conductor 74.

An advantage of the invention resides in how well the same is adapted for the application of indicator lights thereto. For example, indicator lights may be provided to indicate which tank is being filled, and which tanks, if any, are in readiness to be filled. Such indicator lights are shown in Figure 1 with respect to tank 10, it being evident that similar provision may be made for each tank. Indicator light 480 is connected between the leads 120 and 124 so as to be in parallel with the valve 32 and therefore be energized concurrently therewith. Thus, illumination of indicator light 480 indicates that tank 10 is being filled. Obviously, the indicator light 480 may be located adjacent the switch 50, or adjacent the tank 10, as desired, or two lights at such positions may be employed with a minimum of wiring required.

Indicator light 482 is connected between the leads 104 and 112, so that the same is energized whenever tank 10 is in the process of being filled or is in readiness to be filled. Accordingly, the status of tank 10 in so far as the automatic operation of the equipment is concerned may be fully ascertained upon visual inspection of indicator lights 480 and 482.

The form of tank selector and switcher illustrated in Figure 3 is likewise adapted for the attachment of indicator lights thereto. An indicator light, not shown, may be connected between either lead 270 or lead 292 and ground for the same purpose of indicator light 480 described in connection with Figure 1. Similarly, an indicator light, not shown, may be bridged across the electric lamp 208 for the same purpose that the indicator light 482 is provided with the form of the invention shown in Figure 1.

The production curtailing apparatus may be provided with indicator lights to indicate the failure of the tank switcher to select a tank and to indicate the overfilling of either of the vessels 380 and 382. An indicator light 484 is connected between the leads 440 and 444 so as to be energized whenever the switch element 136 is closed, or in other words, whenever the tank switcher fails to locate a tank for filling.

Another indicator light 486 is connected between the leads 430 and 448 so as to be energized whenever either of the switches 394 and 396 are closed with the switch 447 being in its normally closed position.

The invention is of course subject to numerous variations within the spirit thereof that will readily occur to those skilled in the art. Exemplary of such variations, a slight change in electrical circuitry will render the solenoid 412 capable of curtailing oil well production only when the switch 426 of the master clock control means 400 is closed. Such change involves merely connecting the lead 442 to the lead 436 instead of the lead 440, so that the solenoid 412 is in series with the switch 426.

In the light of the foregoing, the structure and operation of the invention will be fully understood, and further explanation is thought to be unnecessary. The invention has been set forth in considerable detail in the interest of conveying a full and complete understanding thereof, and such detailed description should not be considered as unduly limiting the invention, but rather the appended claims should be referred to in order to ascertain the actual scope of the invention.

What I claim is:

1. In the combination of means for supplying fluid to a multiple-tank battery and automatic electric control apparatus for sequentially filling selected tanks of such battery with supplied fluid to a predetermined extent that includes tank selecting means operable upon the filling of one tank to select automatically the tank next to be filled with such tank-selecting means having an electric circuit that is closed solely during the interval between the filling of one tank until the tank next to be filled is selected, the improvement comprising electrical means responsive to substantially continuous closure of said electric circuit for a predetermined period of time to curtail the functioning of the first mentioned means.

2. The combination of claim 1, wherein said electrical means includes a time-delay switch actuating means connected to said electric circuit.

3. Apparatus for controlling the storage of a fluid in a multiple-unit storage facility and for controlling the supply of fluid to such storage facility comprising, an electric power source, a plurality of normally-open valve actuating circuits connected to the power source each including an electrically operated valve actuator, a normally-closed selector circuit connected to the power source, means for maintaining the selector circuit open whenever any one of the valve-actuating circuits is closed, control means associated with each valve-actuating circuit for selectively preventing such circuit being closed, circuit closing means including a prime mover in said selector circuit, said circuit-closing means being effective during the time that the selector circuit is closed to sequentially close the valve-actuator circuits that are not denied closure by said control means, electrically operated means for controlling the supply of fluid to the storage facility, means effective upon substantially continuous closure of said selector circuit for a predetermined period of time to cause the last mentioned means to curtail the supply of fluid.

4. The combination of claim 3, wherein said circuit closing means comprises a photoelectric circuit means associated with each valve-actuating circuit and connected to the power source for closing the valve-actuating circuit, each of said photoelectric circuits including a light-sensitive element and a normally energized electric light source arranged to illuminate such element, light-masking means for masking all but a selected one of the light-sensitive elements, and means including said prime mover for moving said masking means to sequentially unmask the light-sensitive elements.

5. The combination of claim 3, wherein said circuit closing means comprises a plurality of electric circuits corresponding in number to the valve-actuating circuits, selector switch means connected to the prime mover for actuation thereby, each of said electric circuits being connected to the power source through the selector switch means and including means effective during the time that such electric circuit is closed to maintain one of the valve-actuating circuits closed.

6. Apparatus for controlling oil well production and the storage of produced oil in a multiple-tank battery comprising, an electric power source, a plurality of normally-open valve actuating circuits connected to the power source each including an electrically-operated valve actuator for actuating a tank-inlet valve, a selector switch, a normally-closed selector circuit connected to the power source and including electrical means for actuating the selector switch, a control circuit associated with each valve-actuating circuit with each control circuit being connected to the power source through the selector switch and including in series a control switch means and means operable upon energization to actuate closure of its associated valve-actuating circuit and also actuate opening of the selector circuit, electrical means for controlling oil well production including switch means effective upon actuation to cause curtailing of oil well production, and means responsive to the substantially continuous closure of the selector circuit for a predetermined time to actuate the last mentioned switch means.

7. The combination of claim 6, wherein the last recited means includes a time-delay switch actuating means connected to said selector circuit.

8. The combination of claim 6, including electric clock means for actuating said switch means.

9. A control system for controlling the production of a plurality of oil wells and for controlling the storage of oil produced thereby in a multiple-tank battery, said system comprising a fluid conduit provided with a plurality of oil well branches and a plurality of tank branches, each of said oil well branches being provided with an electrically-actuated oil well control valve normally energized to open position, each of said tank branches being provided with an electrically-actuated tank-inlet valve that is normally de-energized and in closed position, automatic electrical means for selecting and sequentially energizing tank-inlet valves of tanks in readiness to be filled, such automatic electrical means including an electric circuit that is energized substantially solely during the intervals that all tank-inlet valves are de-energized, and means responsive to said electric circuit remaining substantially continuously energized a predetermined time to de-energize all of said oil well control valves.

10. The combination of claim 9, wherein said last named means includes a time-delay switch actuating means connected to said electric circuit.

11. A control system for controlling the production of a plurality of oil wells and for controlling the storage of oil produced thereby in a multiple-tank battery, said system comprising a fluid conduit provided with a plurality of oil well branches and a plurality of tank branches, at least some of the individual oil well branches being provided with an electrically-actuated oil well control valve normally energized to open position, at least some of the individual oil well branches being provided with a normally-energized electrically-actuated oil well pump, each of said tank branches being provided with an electrically-actuated tank-inlet valve that is normally de-energized and in closed position, automatic electrical means for selecting and sequentially energizing tank-inlet valves of tanks in readiness to be filled, such automatic electrical means including an electric circuit that is energized substantially solely during the intervals that all tank-inlet valves are de-energized, and means responsive to said electric circuit remaining substantially continuously energized a predetermined time to de-energize all of said electrically-actuated oil well control valves and oil well pumps.

12. A control system for controlling the production of a plurality of oil wells and for controlling the storage of oil produced thereby in a multiple-tank battery, said system comprising a fluid conduit provided with a plurality of oil well branches and a plurality of tank branches, an oil-treating vessel interposed in said conduit intermediate said oil well branches and said tank branches, each of said oil well branches being provided with an electrically-actuated oil well control valve normally energized to open position, each of said tank branches being provided with an electrically-actuated tank-inlet valve that is normally de-energized and in closed position, automatic electrical means for selecting and sequentially energizing tank-inlet valves of tanks in readiness to be filled, such automatic electrical means including an electric circuit that is energized substantially solely during the intervals that all tank-inlet valves are de-energized, and electrical control means responsive to said vessel being filled above a predetermined level and also responsive to said electric circuit remaining substantially continuously energized a predetermined time to de-energize all of said oil well control valves.

13. A control system for controlling the production of a plurality of oil wells and for controlling the storage of oil produced thereby in a multiple-tank battery, said system comprising a fluid conduit provided with a plurality of oil well branches and a plurality of tank branches, an oil-treating vessel interposed in said conduit intermediate said oil well branches and said tank branches, an electrically-actuated oil well control valve normally energized to open position in each of the oil well branches, an electrically actuated flow control valve normally de-energized and in open position in the conduit intermediate the oil well branches and said vessel, each of said tank branches being provided with an electrically-actuated tank-inlet valve that is normally de-energized and in closed position, automatic electrical means for selecting and sequentially energizing tank-inlet valves of tanks in readiness to be filled, such automatic electrical means including an electric circuit that is energized substantially solely during the intervals that all tank-inlet valves are de-energized, and electrical control means responsive to said vessel being filled above a predetermined level to de-energize all of said oil control valves and to energize said flow control valve, said control means being also responsive to said electric circuit remaining substantially continuously energized a predetermined time to de-energize all of said oil well control valves.

14. In combination with apparatus for controlling oil well production and the storage of oil therefrom in a tank battery of the type that operates to sequentially fill empty tanks and wherein an actuating electric potential is applied upon one tank becoming full to an electrical device that automatically selects the tank next to be filled with such potential being removed upon completion of such selection; electrically-operated time-delay means arranged to be concurrently subjected to an electrical potential with said electrical device for curtailing oil well production.

15. In apparatus for controlling the introduction of fluid into a multiple-unit storage facility, an electric power source, a plurality of normally-open valve-actuating circuits connected to the power source each including an electrically-operated valve actuator, a normally-closed selector circuit connected to the power source, means for maintaining the selector circuit open when ever any one of the valve-actuating circuits is closed, control means associated with each valve-actuating circuit for selectively preventing such circuit being closed, and circuit-closing means including a prime mover in said selector circuit, said circuit-closing means being effective during the time that the selector circuit is closed to sequentially close the valve-actuator circuits that are not denied closure by said control means.

16. The combination of claim 15, wherein said circuit closing means comprises a photoelectric circuit means associated with each valve-actuating circuit and connected to the power source for closing the valve-actuating circuit, each of said photoelectric circuits including a light-sensitive element and a normally-energized electric light source arranged to illuminate such element, light-masking means for masking all but a selected one of the light-sensitive elements, and means including said prime mover for moving said masking means to sequentially unmask the light-sensitive elements.

17. The combination of claim 16, wherein said control means includes a normally-closed electric switch means in series with each light source for breaking the circuit through the light source.

18. The combination of claim 17 with a detecting means in association with each of the electric switch means for opening the latter.

19. The combination of claim 15, wherein said circuit-closing means comprises a photoelectric circuit means associated with each valve-actuating circuit and connected to the power source for closing the valve-actuating circuit, each of said photoelectric circuits including a light-sensitive element and a normally-energized electric light source arranged to illuminate such element, light-masking means for masking all but a selected one of the light-sensitive elements, means including said prime mover for moving said masking means to sequentially unmask the light-sensitive elements, said photoelectric circuit means including an electric amplifier tube having a heater element electrically connected to the power source, and means for preventing operation of the prime mover for a predetermined time after the power source is operative, whereby the heater will be effectively heated before the prime mover can operate.

20. The combination of claim 15, wherein said circuit-closing means comprises a plurality of electric circuits corresponding in number to the valve-actuating circuits, selector switch means connected to the prime mover for actuation thereby, each of said electric circuits being connected to the power source through the selector switch means and including means effective during the time that such electric circuit is closed to maintain one of the valve-actuating circuits closed.

21. The combination of claim 15, wherein said circuit-closing means comprises a plurality of electric circuits corresponding in number to the valve-actuating circuits, selector switch means connected to the prime mover for actuation thereby, each of said electric circuits being connected to the power source through the selector switch means and including means effective during the time that such electric circuit is closed to maintain one of the valve-actuating circuits closed, said control means comprising an electric switch means in each of the electric circuits for opening the latter.

22. The combination of claim 15, wherein said circuit-closing means comprises a plurality of electric circuits corresponding in number to the valve-actuating circuits, selector switch means connected to the prime mover for actuation thereby, each of said electric circuits being connected to the power source through the selector switch means and including means effective during the time that such electric circuit is closed to maintain one of the valve-actuating circuits closed, said control means including electric switch means in each of the electric circuits, and detecting means for actuating said electric switch means.

23. In apparatus for controlling the introduction of fluid into a multiple-unit storage facility, an electric power source, a plurality of switch means each including first and second pairs of terminals and terminal bridging means normally bridging the first pair of terminals for selectively bridging the pairs of terminals, a selector circuit connected to the power source and including in series all of the first pairs of terminals, a valve-actuating circuit associated with each of said switch means and including in series the second pair of terminals of such switch means and an electrically-operated valve actuator, a normally-open electric circuit associated with each of said switch means and connected to the power source and including means effective during energization to cause one of the bridging means to selectively bridge one of the second pair of terminals, and means for selectively closing said electric circuits including a prime mover in the selector circuit.

24. The combination of claim 23, wherein the last mentioned means includes a selector switch through which each of the electric circuits is connected to the power source, a control switch in each of the electric circuits, and means operatively connecting the prime mover to the selector switch.

25. The combination of claim 23, wherein the last mentioned means comprises photoelectric circuit means associated with each electric circuit and connected to the power source for closing the electric circuit, each of said photoelectric means including a light-sensitive element and a normally-energized electric light source arranged to illuminate the light-sensitive element, a control switch in series with each electric light source, masking means for selectively masking all but one of the light-sensitive elements from its associated electric light source, and means operatively connecting the prime mover to the masking means.

26. In apparatus for controlling the introduction of fluid into a multiple-unit storage facility, an electric power source, a plurality of normally-open valve actuating circuits connected to the power source each including an electrically-operated valve actuator, a selector switch, a normally-closed selector circuit connected to the power source and including electrical means for actuating the selector switch, a control circuit associated with each valve-actuating circuit with each control circuit being connected to the power source through the selector switch and including in series a control switch means and means operable upon energization to actuate closure of its associated valve-actuating circuit and also to actuate opening of the selector circuit.

27. The combination of claim 26, including detecting means adapted to detect a predetermined condition of readiness of a storage unit to receive fluid for actuating each of said control switch means.

28. In apparatus for controlling the introduction of liquid from a common source into a plurality of storage tanks each of which is provided with an inlet valve and an electrical actuator therefor, a liquid-level detector and a switch actuated thereby, and an outlet valve equipped with an electric switch adapted to open and close therewith; the improvement comprising a power source, a plurality of normally-open inlet-valve actuating circuits each connected to the power source and including one of the electrical inlet-valve actuators, a rotary selector switch, a control circuit associated with each inlet valve actuating circuit with such control circuits being connected to the power source through the selector switch, each of the control circuits including in series one of the switches actuated by a liquid-level detector, one of the switches with which the outlet valves are equipped and electrically operated means for closing one of the inlet-valve actuating circuits, a normally-closed selector switch actuating circuit connected to the power source and including electrically-operated means for actuating said selector switch, and means for opening the selector switch actuating circuit whenever any one of the inlet-valve actuating circuits is closed.

29. The combination of claim 28 including a further electric switch in each of the control circuits and in series with the other switches in such control circuit.

30. The combination of claim 15 including a further electric switch, and means for actuating such further electric switch upon substantially continuous closure of the selector circuit for a predetermined time.

References Cited in the file of this patent

UNITED STATES PATENTS

| | | |
|---|---|---|
| 2,024,179 | Morrow | Dec. 17, 1935 |
| 2,115,827 | Powell | May 3, 1938 |
| 2,144,033 | Root | Jan. 17, 1939 |
| 2,572,621 | Hobson | Oct. 23, 1951 |
| 2,594,181 | Kliegl et al. | Apr. 22, 1952 |
| 2,605,780 | Nance | Aug. 5, 1952 |
| 2,668,249 | Nagel | Feb. 2, 1954 |